(12) United States Patent
Evers et al.

(10) Patent No.: US 6,386,098 B1
(45) Date of Patent: May 14, 2002

(54) PRE-PACKAGED FOOD WARMER

(75) Inventors: Gilbert J. Evers, Lansing, IL (US);
Nenad Vidojevic, Chesterton, IN (US);
Charles D. Cretors, Lake Forest, IL (US)

(73) Assignee: C. Cretors & Co., Chicago, IL (US)

( * ) Notice: Subject to any disclaimer, the term of this patent is extended or adjusted under 35 U.S.C. 154(b) by 0 days.

(21) Appl. No.: 09/827,638

(22) Filed: Apr. 6, 2001

Related U.S. Application Data
(60) Provisional application No. 60/214,890, filed on Jun. 28, 2000.

(51) Int. Cl.[7] .............................. A23L 1/00; A47J 37/00; A47J 39/00; A47J 39/02; A47J 47/14
(52) U.S. Cl. ...................... 99/483; 99/331; 99/357; 99/468; 99/448; 219/214; 219/385; 219/400; 221/92; 221/150 A
(58) Field of Search ........................... 99/330–333, 339, 99/340, 357, 370, 342, 352–355, 426, 444–450, 467–476, 483, 485, 451, DIG. 14; 312/236; 426/231–233, 237, 520–523; 221/150 A, 150 R, 150 HC, 92, 153; 126/369, 219, 348; 219/392–396, 385–387, 214, 399–402, 408–411, 620–622, 626; 222/146.5; 34/212, 216, 223, 218, 219

(56) References Cited

U.S. PATENT DOCUMENTS

| 4,517,446 | A | * | 5/1985 | Torning ...................... 219/386 |
| 4,605,267 | A | * | 8/1986 | Rinkewich ............... 312/236 X |
| 4,835,368 | A | * | 5/1989 | Fortmann et al. ....... 219/400 X |
| 4,891,498 | A | * | 1/1990 | Fortmann et al. ......... 99/331 X |
| 4,939,987 | A | * | 7/1990 | Smith ........................ 99/483 X |
| 5,025,132 | A | * | 6/1991 | Fortmann et al. ......... 99/357 X |
| 5,132,520 | A | * | 7/1992 | Blanton et al. ......... 219/400 X |
| 5,209,941 | A | * | 5/1993 | Wuest .................... 426/523 X |
| 5,285,051 | A | * | 2/1994 | DeGrow et al. ............ 219/386 |
| 5,365,039 | A | * | 11/1994 | Chaudoir .................. 99/468 X |
| 5,449,232 | A | * | 9/1995 | Westbrooks, Jr. et al. .. 312/236 |
| 5,520,102 | A | * | 5/1996 | Monetti .................... 99/483 X |
| 5,852,967 | A | * | 12/1998 | Fortmann et al. ......... 99/483 X |

\* cited by examiner

Primary Examiner—Timothy F. Simone
(74) Attorney, Agent, or Firm—Vedder, Price, Kaufman & Kammholz

(57) ABSTRACT

Food preparation apparatus including a housing having a top wall and a front wall. Each wall having an aperture defined therein. A passageway for warming and storing pre-packaged food products extends from an entrance at the top wall aperture to an exit at the front wall aperture. A plurality of chutes are formed within the passageway for channeling the food products from the entrance to the exit. A plurality of electrical elements for warming the food products to preselected temperature surround each chute. The warming elements maintain the food products at a preselected temperature until they are removed from the housing.

19 Claims, 2 Drawing Sheets

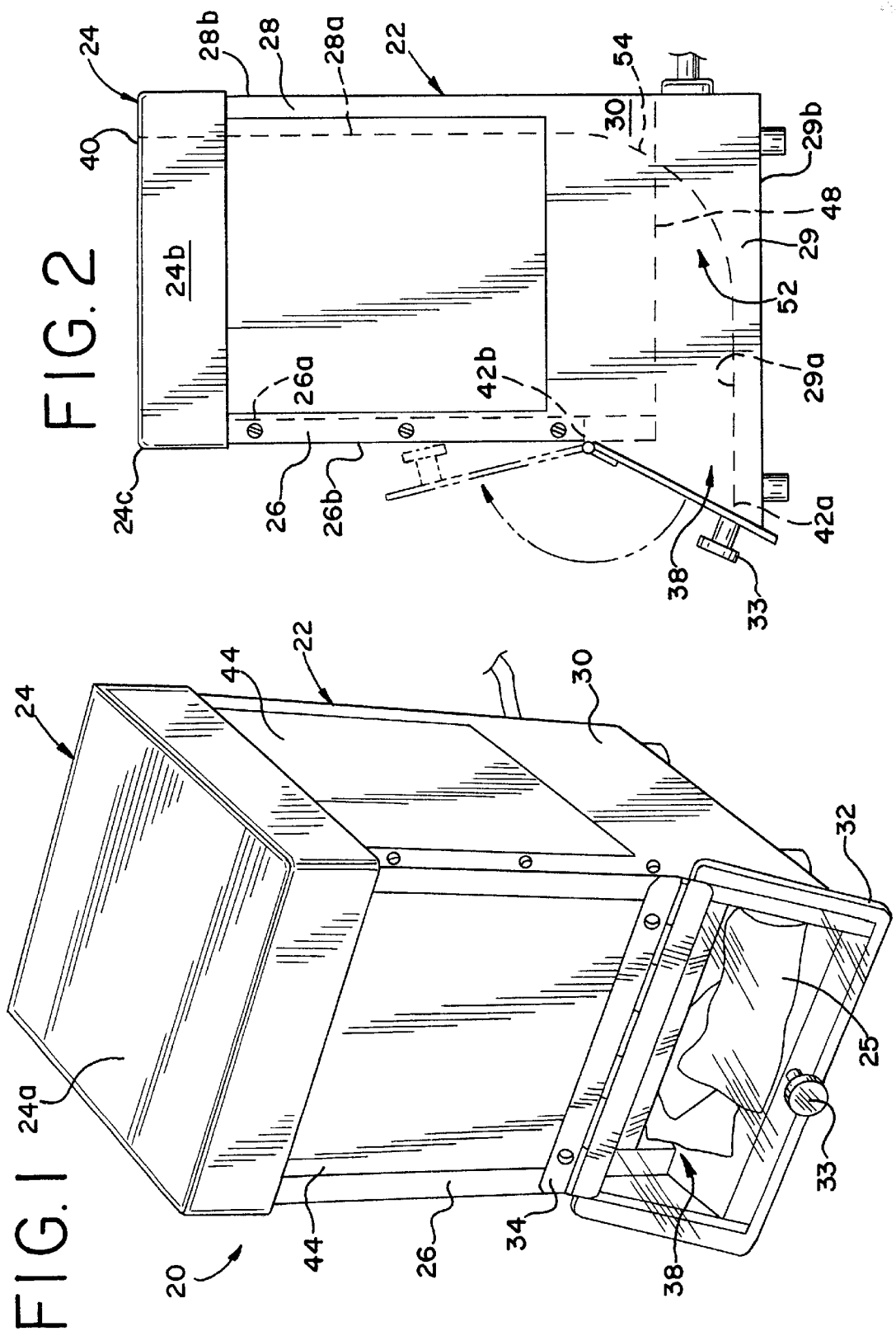

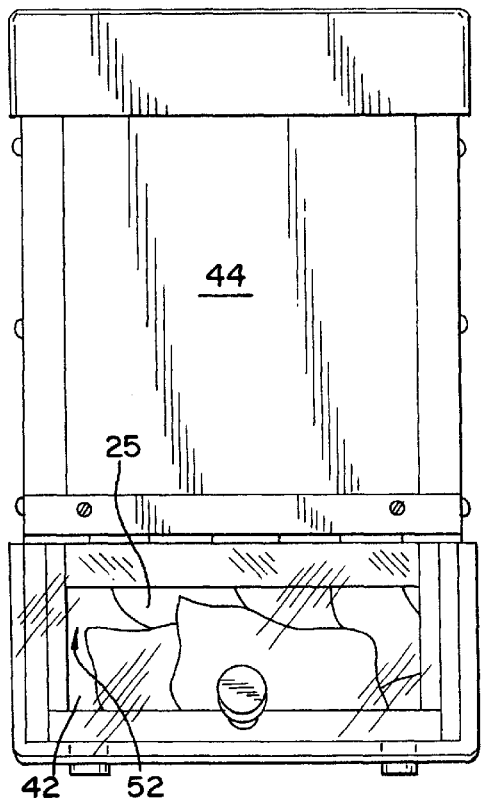
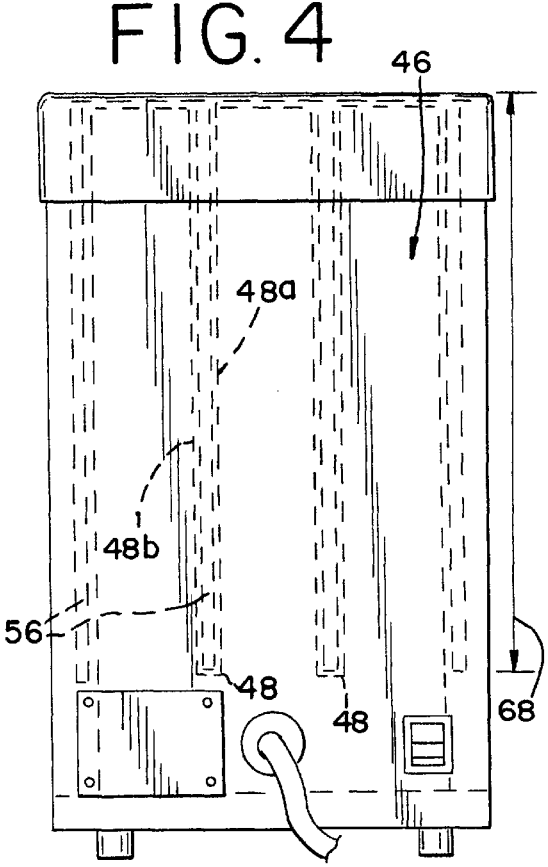
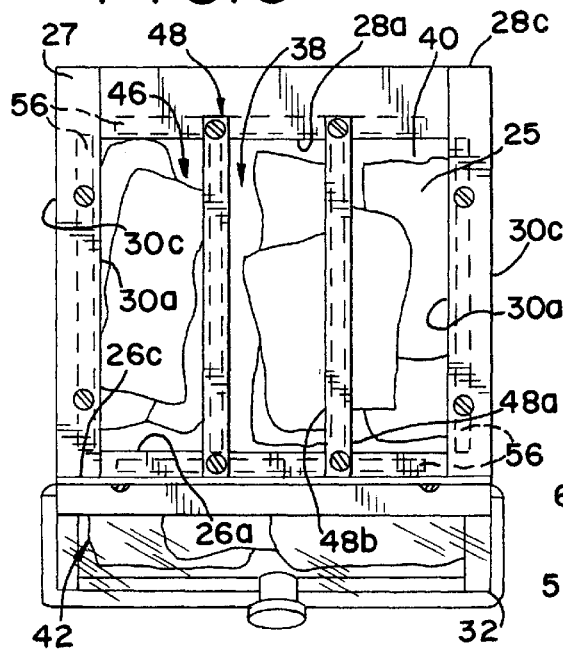
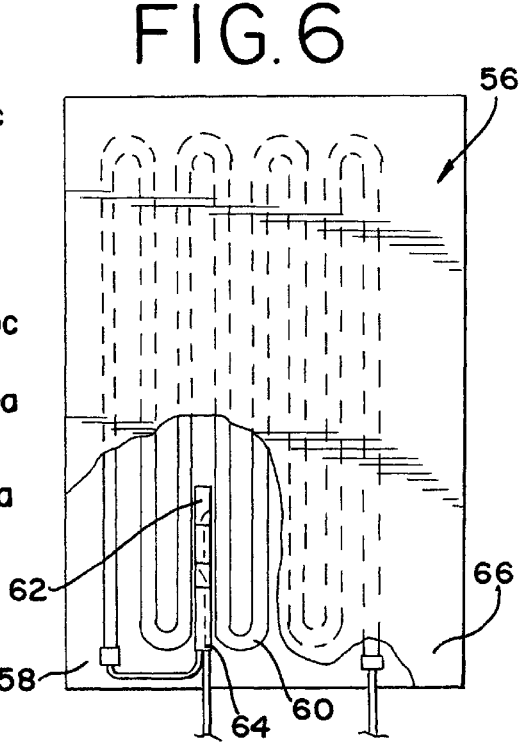

US 6,386,098 B1

PRE-PACKAGED FOOD WARMER

This Application claims the benefit of U.S. Provisional application No. 60/214,890, filed Jun. 28, 2000.

BACKGROUND OF THE INVENTION

The present invention relates to a food preparation apparatus and more particularly, to a device for warming and storing pre-packaged food products.

The Mexican-derived shack food, commonly known as nachos, includes corn tortilla chips and melted cheese. In restaurants or at home, nachos are made by distributing shredded cheese over the tortilla chips and placing the combination into an even. When the cheese melts, the snack is ready for additional condiments, serving and consumption. This process results in a tasty snack, however, the process is disadvantageous for preparing large quantities in that, the process is very time consuming, labor intensive, and would require large, very hot ovens. Thus, there is no need for an apparatus which would pre-heat pre-packaged cheese to avoid these disadvantages.

Over the years this snack food has become a favorite of patrons at large event gatherings such as sporting events, conventions and fairs. Quick preparation is the most important. Profit margins are significantly reduced if the time to prepare is lengthy. Accordingly, a device was developed that used conventional food warming technology. A pan of processed cheese sauce was placed into a receptacle formed in a base. A heating element and water are disposed in the receptacle for warming the pan and the cheese sauce disposed therein. Thus, a food service worker could use a spoon to ladle the cheese saute onto the tortilla chips. While this was much faster than the previous method, disadvantages of this method are a messy workstation, skin forming atop the cheese sauce, potential for burns while changing the pans, product waste, difficulties in cleaning baked on cheese saute, and a large number of parts to clean.

The conventional method was further refined by the addition of a lid with an integral pump. The operator now only needed to push down on the pump handle in order to discharge the cheese saute from the pump nozzle. This system reduced the skin on top of the cheese sauce, and the disorderly work station, however, the device was now more complex and just as dirty, wasteful and more difficult to clean properly.

Thus, there remains the need for an apparatus which heats pre-packaged cheese or other pre-packaged food products such as chili, gravy or stew, to a serving temperature which requires minimal maintenance or cleanup, is simple to use and uses only the necessary amount of product required.

SUMMARY OF THE INVENTION

Accordingly, it is a general object of the present invention to provide a novel warming apparatus for pre-packaged food products.

Another object of the present invention is to provide a warmer for pre-packaged food products which evenly and slowly heats the food product to the preselected temperature such that the food product can be safely handled.

Still another object of the present invention is to provide a warmer for pre-packaged food products which reduces the amount of labor associated with preparing of such.

Yet another object of the present invention is to provide a warmer for pre-packaged food products which can accommodate a large amount of food products to support a high volume production.

Still yet another object of the present invention is to provide a warmer for pre-packaged food products which has warming elements isolated from direct contact with workers or the food products.

These objects are accomplished by at least one principal aspect of the present invention in which the food preparation apparatus includes a housing having a top wall and a front wall. The top and front walls each have an aperture defined therein. A passageway for warming and storing the pre-packaged food products extends from an entrance at the top wall aperture to an exit at the front wall aperture. A plurality of chutes are formed within the passageway for channeling the food products from the entrance to the exit. A plurality of electrical elements for warming the food products to a preselected temperature where the warming elements surround each chute. Accordingly, the warming elements maintain the food products at the preselected temperature until they are removed from the housing.

In another principal aspect of the present invention a device for heating and storing pre-packaged food products prior to use includes a hollow housing formed by a plurality of interior and exterior panels defining first and second openings which are in communication. A tubular recess is defined in the housing between the first and second openings having a divided first portion and a common area second portion. The divided portion includes a plurality of panels defining walls which subdivide the tubular recess. A heating zone is defined by a plurality of elements for warming the food products to a preselected temperature disposed between the interior and exterior panels, and within the walls such that each surface of the divided portion radiates and conducts heat at the preselected temperature in order to increase the temperature of the food products. A maintaining zone is defined by an additional heating element disposed in the common area second portion adjacent the second opening such that said food products maintain the preselected temperature until used.

These and other objects, features and advantages of the present invention will become apparent from the following description, taken in conjunction with the accompanying drawings, wherein like reference numerals refer to like parts.

BRIEF DESCRIPTION OF THE DRAWINGS

In the course of the following detailed description, reference will be made to the attached drawings in which:

FIG. 1 is perspective view of a pre-packaged food warmer constructed in accordance with the principles of the present invention;

FIG. 2 is an elevation view of the right side of the warmer in FIG. 1, where the left side is virtually identical save for the difference in orientation;

FIG. 3 is an elevation view of the front side of the warmer in FIG. 1;

FIG. 4 is an elevation view of the back side of the warmer in FIG. 1;

FIG. 5 is a plan view of the top side of the warmer in FIG. 1 showing the pre-packaged food product disposed within the divided, chute portion; and, FIG. 6 is a detailed, partially broken away view of a heating element which may be used in connection with the warmer of FIG. 1.

DETAILED DESCRIPTION OF THE PREFERRED EMBODIMENTS

FIGS. 1 and 3 illustrate a pre-packaged food warmer 20 constructed in accordance with the principles of the present invention. The warmer includes a housing 22 and a lid 24. The housing has a hollow cavity, passageway or tubular recess 38 defined within a front wall 26, rear wall 28, a pair of side walls 30, a top wall 27 and a bottom wall 29. The walls 26 and 28–30 are formed by respective interior and exterior panels. The interior panels associated with each wall are identified by the addition of the suffix "a" to each element number 26 and 28–30, such that the front interior panel 26a, rear interior panel 28a, side interior panels 30a, and bottom interior panel 29a are thus defined. The exterior panels associated with each wall 26 and 28–30 are identified by the addition of the suffix "b" to each element number 26 and 28–30, such that the front exterior panel 26b, rear exterior panel 28b, side exterior panels 30b and bottom exterior panel 29a are thus defined. The top wall 27 is formed as a band disposed adjacent the perimeter of the housing cooperatively defined between the upper edges 26c, 28c, and 30c of the front 26a and 26b, rear 28a and 28b and side 30a and 30b panels. The top wall 27 surrounds and defines an entrance 40 to the passageway 38.

Advertising indicia may be disposed on the adhesively-affixed substrate 44, which may be affixed to the exterior panels 26b, 28b and 30b.

The lid 24 has a top wall 24a and a plurality of sidewalls 24b depending from the edges 24c of the top wall 24a. The perimeter of the top wall 24a is jointly defined by the edges 24c, and is greater than the perimeter of the top wall 27 jointly defined by the upper edges 26c, 28c and 30c, such that the lid 24 is operatively connected to the housing 22 to enclose the entrance 40 of the tubular recess 38. The lid 24 is preferably made from any conventional heat resistant plastic which may be transparent or opaque.

A cover to door 32 is movably connected to the front panel 26a, preferably for pivotal movement. As shown, a piano-type hinge 34 connects the door 32 to the housing 22. It will be understood that a living hinge constructed of any conventional heat resistant plastic may be substituted therefor. The door 32 is configured as a closure for an exit 42 of the passageway or tubular recess 38. The cover 32 preferably is oriented at an angle to the front wall 26 as shown in FIGS. 1 and 2 in order to allow an operator easy access to the food product 25 when the door 32 is in an open position. The cover 32 is also formed from a conventional heat-resistant plastic, which is preferably transparent. As shown, a handle 33 for the cover 32 enables the operator to quickly and easily move the door 33 from a closed position shown in FIGS. 1–3 and 5, into an open position (shown) in phantom in FIG. 2. It will be understood that the handle 33 is not required, and the operator may used an edge of the door 33 as such. In the open position, an operator has free unimpeded access to the passageway exit 42, on that the operator may retrieve warmed pre-packaged food products 25. The handle 33 may be formed from any material, preferably a plastic material in order to maintain a low cost. Preferably, the handle 33 is connected to the cover 32 by a metallic fastener (not shown) which preferably engages a magnetic latch (not shown) when the door 32 is in a closed position. It will be noted that such magnetic latch is not required because as configured, when the operator closes the door 33, it will remain in the closed position until opened again by the operator. Thus, the door 32 is secured to the housing 22 when in the closed position. The exit 42 is defined and disposed in a plane which is angularly offset from the horizontal plane in which the entrance 40 is defined.

FIG. 2 illustrates, in phantom, the layout of the passageway or tubular recess 38, the subdividing walls 48 in the divided position 50, and the common area portion 52. The passageway 38 is substantially J shaped. A divided portion 50 generally defines the vertical element of the J, and the common area portion 52 generally defines the lower, arcuate element of the J. The rear interior panel 28a and bottom interior panel 29a cooperatively define one element of the passageway which extends from the entrance 40 to a lower edge 42a of the exit 42. The rear interior panel 28a includes a vertical element disposed adjacent the entrance 40. The bottom interior panel 29a includes a horizontal element disposed adjacent the exit 42. An intermediate interconnecting element 54 is formed as a sector of a circle between the vertical element of the rear interior panel 28a and the horizontal element of the bottom interior panel 29a. Preferably, the sensor is defined as a quadrant of a circle. The interconnecting element 54 urges the pre-packaged food products 25 to change direction from vertical to horizontal toward the exit 42. The front interior panel 26a also extends from the entrance 40 to an upper edge 42b of the exit 42. However, the front interior panel 26a includes only a vertical element, approximately similar in extent to the vertical element of the rear interior panel 28a. The side interior panels 30a additionally include an element which extends from the entrance 40 to the exit 42 following the contour of the front 26a and rear 28a interior panels. Thus, the passageway 38 is cooperatively defined by association of the interior panels 26a, 28a, 29a and 30a as a generally tubular recess. Preferably, the recess 38 has a rectangular cross-section.

FIGS. 4 and 5 illustrator a plurality chutes 46 and chute walls 48 disposed in the divided portion 50. The chutes 46 are jointly defined by the exterior panels 26a, 28a, and 30a and the panels 48a and 48b which form the chute walls 48. Each chute wall 48 preferably extends between two parallel interior panels. As shown, the chute walls 48 interconnect the front interior panel 26a to the rear interior panel 28a. It will be understood that this invention will function as intended with the chute walls 48 connecting the side interior panels 30a. Further, it will be noted that the number of chutes and the size of such are only limited by the physical dimensions of the warmer and the pre-packaged food products. The chute walls 48 preferably have a vertical extent substantially similar to the front wall 26. The configuration of the chute walls 48 enables the chutes 46 to provide maximum, efficient heating capability without restricting the movement of the food product 25 into the common area portion 52.

FIG. 3 illustrates the food product 29 disposed in the common area portion 52. The food product 25 remains in the common area portion 52 until an operator removes it for use. The food product 25 is a pre-packaged food product created on a conventional machine such as a form, fill and seal machine as is common in the package industry. The plastic outer cover is formed as an envelope with one open end. The food product is added through the open end and the pouch is sealed closed. The food product 25 is then ready for handling. The plastic is tolerant of temperatures greater than the boiling point of water, but can melt if the temperature is great enough, it will be noted that the melting temperature of the plastic cannot be reached by the present invention.

FIG. 6 illustrates an electrical element 56 for warming the food products 25 to a preselected temperature. The heating or warming element 56 includes a substrate 58, a resistive element 60, a thermostat 62, a thermal circuit 64, and a pool-off backing 66. The substrate 58 is a flexible material which conforms to curvilinear surfaces. Preferably, the substance 58 is a relatively thin paper-based product. The resistive element 60, as shown, is connected is a first side of the substrate 58, preferably adhered thereto. The thermostat 62 and thermal cut-off 64 are conventional elements which determine the preselected temperature and prevent run-away unsafe temperatures should the thermostat 62 fail. The peel-off backing 66 is removed from the substrate 58 for installation. During manufacturing of the warmer 20, the heating elements 56 are adhered in the interior panels 26a, 28a, 29a and 30a, and the chute walls 48 such that the elements do not enter of intrude into the passageway or tubular recess 38. A heating zone 68 is generally defined in the divided portion 50 of the passageway 38 where the chutes 46 are surrounded on all sides by the heating elements 56. A maintaining zone 70 is generally defined in the common area portion 52 by the heating element 56 adhered to the bottom interior panel 29a disposed adjacent the exit 42.

In use, an operator turns the warmer 20 and allows it to heat to the preselected temperature. The operator then inserts the pre-packaged food products 25 into the chutes 46. While awaiting use, the food products 25 are warmed to the preselected temperature. An operator may open the door 32 and retrieve a food product for use. Preferably, one end of the food product is enter cut or torn either open or off such that the operator may pour or squeeze the food product out of the plastic envelope. The finished food product may then be served to a customer. It will be noted that the warmed food product 52 may remain sealed when served to a customer. Thus, the food product 52 stays at the desired temperature until the customer is ready to eat.

It will be understood that the embodiment of the present invention which has been described herein is merely illustrative of some of the applications of the principles of the present invention. Various modifications, such as different heating element structure, different size of warmer, and different size and number of chutes, may be made by those skilled in the act without departing from the true spirit and scope of the invention.

We claim:

1. A food preparation apparatus, comprising:
   a housing having a top wall and a front wall each having an aperture defined therein:
   a passageway for warming and storing pre-packaged food products extending from an entrance at said top wall aperture to an exit at said front wall aperture;
   a plurality of chutes formed within said passageway for channeling said food products from said entrance to said exit;
   elements for warming said food products to a preselected temperature in association with each said chute;
   whereby said warming elements maintain said food products at said preselected temperature until removed from said housing.

2. The apparatus as recited in claim 1, wherein said passageway is further defined by interior walls which cooperatively define a J shape.

3. The apparatus as recited in claim 2, wherein a first interior wall extends from said top wall to a first edge of said front wall aperture, and a second interior wall extends from said top wall to a second edge of said front wall aperture.

4. The apparatus as recited in claim 1, wherein said chutes are defined by panels disposed between opposing first and second interior walls.

5. The apparatus as recited in claim 4, wherein each said panel is configured to mount at least one of said warming elements so that a surface area of each panel radiates and conducts heat to warm said food products.

6. The apparatus as recited in claim 3, wherein said second interior wall has a curvilinear intermediate portion disposed between a beginning portion and an end portion.

7. The apparatus as recited in claim 1, wherein each warming element is thermostatically controlled in order to maintain said preselected temperature.

8. The apparatus as recited in claim 1, wherein each said warming element includes a conductive trace and control elements formed on a flexible substrate.

9. The apparatus as recited in claim 1, wherein said front wall further includes an angularly offset portion and said front wall aperture is formed therein.

10. The apparatus as recited in claim 6, further including an additional warming element associated with said end portion.

11. The apparatus as recited in claim 8, wherein each said warming element includes a first surface having an adhesive for connection to said walls.

12. The apparatus as recited in claim 1, wherein said plurality of chutes further includes at least two chutes.

13. A device for heating and storing pre-packaged food products prior to use, comprising:
   hollow housing formed by a plurality of interior and exterior panels defining first and second openings in communication but not limited to two openings;
   a tubular recess defined in said housing between said first and second openings having a divided first portion and a common area second portion;
   said divided portion including a plurality of panels defining walls which divide said tubular recess;
   a heating zone defined by a plurality of elements for warming said fond products to a preselected temperature disposed between said interior and exterior panels and within said walls, such that each surface of said divided portion radiates and conducts heat at said preselected temperature in order to increase the temperature of said food products; and,
   a maintaining zone defined by an additional heating element disposed in association with said common area second portion adjacent said second opening such that said food products maintain said preselected temperature until used.

14. The device as recited in claim 13 wherein said first opening is defined in a first plane and said second opening is defined in a second plane such that said first and second planes are angularly oriented.

15. The device as recited in claim 13, wherein said tubular recess has a parallelogram cross-section.

16. The device as recited in claim 13, wherein said tubular recess traverses a path along an axis which changes direction approximately ninety degrees.

17. The device as recited in claim 13, wherein said second opening is associated with a closure device.

18. The device as recited in claim 13, wherein said warming elements include a flexible sheet having a conductive trace disposed thereon and a thermostatic control, which is adhered to said panels and walls for conducting and radiating heat to arm said food products.

19. The device as recited in claim 13, wherein said plurality of panels further includes at least two panels.

* * * * *